No Printed Specification Available
9698X
B. KUGLER.
FURNACE.
Patented June 2, 1836.
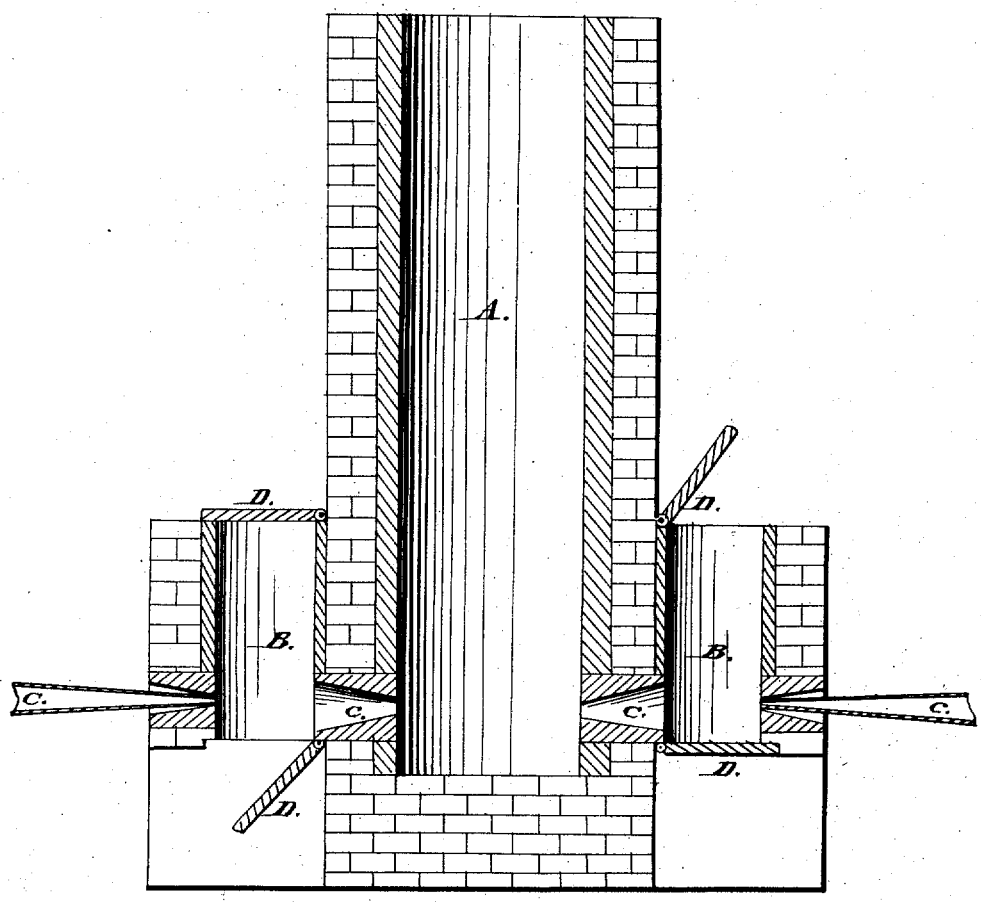

on 16

June 2, 1836

Benjamin Kugler Phil-Penn.

9698X Letters Patent

The Schedule referred to in these Letters Patent and making part of the same containing a description in the words of the said Benjamin Kugler himself of his improvement in the blast furnace for smelting iron and other ores.

To all whom it may concern, be it known that I Benjamin Kugler of the City of Philadelphia in the State of Pennsylvania have invented an improvement in the construction of blast furnaces for the smelting of iron ores, or the ores of other metals with anthracite coal or with other fuel and I do hereby declare that the following is a full and exact description thereof.

In describing the improvement which I have made I shall for the purpose of giving a clear illustration of the principle upon which I proceed refer to the drawings which accompanies this specification without intending thereby to limit myself to the particular forms and arrangements exhibited as the blast furnace which I use may be built in any of the common forms and varied in its dimensions as well as in the mode of arranging the respective parts. A in the accompanying drawing represents the main furnace or stack and B.B. are small chambers or stacks which are to be filled with fuel. These chambers may vary considerably in their dimensions and form but I prefer to make them about [illegible] feet square in the clear and six feet in height C.C. and C̈C̈ are tuyere holes, and the bottom pipes the tuyere holes into which the bellows pipes C C enter may like the other parts of the furnace vary in their dimensions but I intend ^usually to make them [illegible] [illegible] inches in diameter on the outside gradually contracting to a diameter of four inches. A blast of tuyere hole leads from the small chambers or stacks into the main furnace these are seen at C.C. they ought to be exactly opposite to the blow or bellows pipes when the furnace is used the main body is charged with ^the coal, the ore and the fluxing materials in the usual way and the small stacks B.B are filled with anthracite coal or other fuel. When this is ignited and the blast is made to pass through it the ^air becomes heated very intensely so that when it passes the tuyere holes of the main stack the chilling of the slag which the ordinary blast produces is entirely obviated as the air is actually at the temperature of perfect ignition

9698X

D.D.D.D. are moveable tops and bottoms of the small stack for feeding and clearing them when necessary. These stacks may be built permanently against the main stack as shown in the drawing, but it will be found more convenient to place them upon railways so that they may be slid off when it is necessary to repair the inner tuyere in the main stack. When re-placed they are to be firmly attached by flanches with screw or key bolts or in any other way which may be preferred. a proper cement is to be interposed between the two at the places of junction.

Having thus fully described my said invention I do hereby declare that all I claim as my improvement and desire to secure by letters Patent is the use of the small chambers or stacks placed opposite to any or all of the tuyere holes in the main stack operating in the manner and for the purpose set forth namely that the blast from the bellows may first pass through ignited fuel before it enters the main stack within which the ore fluxing materials and fuel are contained and their chilling be thereby prevented and this I claim whatever may be the number of such small stacks and whatever their size or form or whatever the size or form of the main stack and whether the fuel used be wholly anthracite or wholly or in part of some other kind

Witnesses — Benj. Kugler

W. R. Stokes

Edwin Carpenter

Exd [illegible]

734 and

Granted June 2d 1836.

Drawing